Feb. 27, 1940. L. W. SHUTTS 2,191,630
HUMIDITY COMPENSATED THERMOSTAT
Filed June 17, 1937 2 Sheets-Sheet 1

Inventor
Leroy W. Shutts
By Blackmore, Spencer & Flint
Attorneys

Patented Feb. 27, 1940

2,191,630

UNITED STATES PATENT OFFICE 2,191,630

HUMIDITY COMPENSATED THERMOSTAT

Leroy W. Shutts, Lockport, N. Y., assignor to General Motors Corporation, Detroit, Mich., a corporation of Delaware Application June 17, 1937, Serial No. 148,639

2 Claims. (Cl. 200—52)

This invention relates to air condition control apparatus and more specifically to means for controlling temperature and humidity supply sources.

It is a well known fact that from the standpoint of comfort of the occupant of a space being heated or humidified that the addition of heated air alone is not an accurate measure of the comfort. It may be that the temperature in a room is 80° F. or over and yet the occupant does not feel warm enough as the air may be extremely dry. As moisture is added to the air as the humidity is increased, the occupant requires a lower temperature to feel comfortable; for example, with 40% humidity content the occupant will probably feel very comfortable at 70° F. where if the humidity is only 20% he may have to increase the temperature to 80° F. before he will be comfortable. Therefore controlling the source of heat with a means responsive to temperature change only, that is, with the usual thermostat, is insufficient as this in no way takes into account the humidity change. Likewise, if we are supplying humidity to an enclosure, unless we take into consideration the temperature thereof, the correct amount of humidity cannot be maintained if the temperature in any way fluctuates for if we supply moisture to an enclosure at a certain temperature and the temperature falls, the moisture will begin to condense on various portions of the enclosure which of course is not desirable.

It is therefore an object of my invention to provide a compound control sensitive to both humidity and temperature changes.

It is a further object of my invention to provide a control thermostat compensated for humidity changes.

It is a still further object to provide a thermally compensated humidistat.

With these and other objects in view the embodiments of my invention will be best understood with reference to the following specification and claims and the illustrations in the accompanying drawings, in which:

Figures 1, 2:
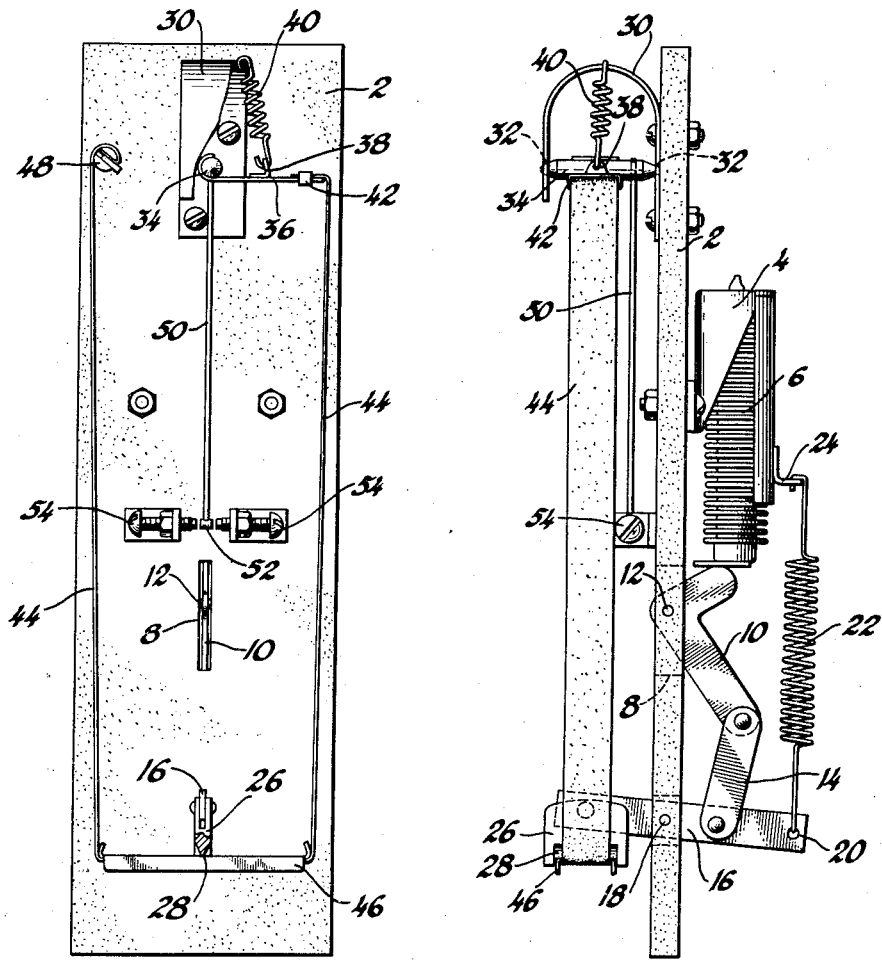
Figure 1 is a front elevation of a thermally compensated humidistat.
Figure 2 is a side elevation of the same.

Referring now specifically to the species shown in Figures 1 and 2, a base plate 2 is provided upon one face of which is carried a cylindrical supporting means 4 which carries therein a Sylphon bellows 6 filled with any suitable material sensitive to changes in temperature so that as the temperature rises the Sylphon bellows will expand and push out the lower end and upon a fall in temperature the same will contract which will lift the lower end.

Adjacent the central portion of the panel 2 is provided a longitudinal slot 8 in which is pivoted the center of a bell crank lever 10 the short arm of which is positioned to lie in proximity to the movable end of the Sylphon bellows so that as the bellows moves in and out the crank will be rotated about its pivot 12. The lower end of the bell crank 10 is connected to a link 14, said link being pivotally connected in turn to an arm 16 which also projects through the base 2 and is pivoted as shown at 18. The outer end of the arm 16 is provided with an opening 20 in which is connected one end of a tension spring 22 the opposite end being hooked into the stationary frame 4 by a bracket 24 rigidly secured thereto. In the end of the lever 16 which projects on the opposite side of the base 2 from the apparatus already described there is carried pivotally thereon a bracket 26 the edge of which is formed into a knife and is shown at 28, the purpose of which will later be evident.

Adjacent the upper edge of the base 2 on this opposite side is provided a semicircular bracket 30, one arm of which is rigidly secured to the base and the other arm being spaced therefrom, both arms having therein aligned openings 32 in which are pivoted as bearings the opposite ends of a pin 34 having tapered end portions. Rigidly secured to the central portion of this pin 34 is an arm 36 extending toward one side of the base and having secured adjacent the middle portion thereof by a bracket 38 one end of a tension spring 40, the opposite end of which is connected to the central portion of the semicircular bracket 30.

To the outer end of the arm 36 is secured by a clamp 42 one end of a paper strip 44 which, as will be obviously seen from the drawings extends down practically full length of the base 2 and then extends at right angles to its original direction through a flanged arm 46 which runs across the base. The central portion of the flanged arm contacts the edge of the knife at 28 and is maintained against said knife edge by the tension of the paper strip which continues up the other side of the base and is anchored by a suitable means such as securing screw 48.

The paper strip is of course the element which is sensitive to humidity changes in the surrounding atmosphere for as the humidity content increases the paper strip will absorb more moisture and stretch or sag which will allow the arm 46 to pivot about the knife edge 28. The purpose of this knife edge is to permit linear movement of the paper with no points at which friction might absorb a portion of the energy due to expansion or contraction of the paper strip as the energy imparted thereby is rather small. This stretching also allows the arm 36 to be moved upwardly due to the action of the spring 40 and of course with it rotates the pin 34.

Rigidly secured to the pin 34 is also connected an arm 50 which is substantially vertical as shown herewith and carries on its lower extremity a contact 52 which is adapted to swing between two spaced adjustable contacts 54. The base 2 in this case is of insulating material and a conventional three-wire control system may be connected to this instrument by being connected to both terminals 54 and to the arm 50 or the pin 34 as the person making the installation desires.

The operation of this device is of course fairly obvious. As the humidity in the room or space in which the instrument is located decreases, the paper strip will dry and tend to shrink which will rotate the arm 36 in a clockwise direction as viewed in Figure 1 and force the arm 50 to the left causing contact between the element 52 and left hand element 54 which connected to the conventional apparatus will supply moisture to the space. If the space to be heated has an overabundance of moisture content present, the paper strip 44 will stretch allowing counterclockwise movement of the arm 36 as influenced by the spring 40 which will cause contact between element 52 and right hand element 54. This may stop the supply of humidity to the space or may cause a faster circulation of air to carry off the moisture content, depending upon the desires of the operator.

Let us suppose however that during this time the temperature within the space has varied and therefore to compensate for this temperature change the Sylphon bellows 6 has caused the rotation of bell crank 10 thereby changing the position of the knife edge 28 which will alter the tension on the humidity element to effect a change in the humidity control due to a rise or a fall of temperature.

The species shown in Figures 3, 4, 5 and 6 is that of a thermostat compensated for humidity changes and in which the closure of the pair of contacts affects the supply of heat instead of the supply of moisture content. In this case we have an insulated base member 60 upon which is mounted a roughly U-shaped bracket 62 to one arm of which is secured a short shaft 64 by a machine screw 66. Supported on this shaft is a helical bimetallic element 68 sensitive to variations in temperature and also supported on the same shaft in spaced relation and rotatable with respect to said shaft are two vertical arms 70 and 72. Secured to the arm 70 approximately midway between the ends is a pin 74 which projects over and is connected to the upper end of the bimetallic helical coil 68. Carried on the upper end of this arm 70 is a double contact 76.

The arm 72 is slightly wider than the arm 70 and is slotted as shown at 78 for a considerable length. Secured across the top of the arm 72 is an insulating arm 80 which extends an equal distance on either side of the arm 72 and carries on each side a stationary adjustable contact 82 and 84 which contacts are adapted to be positioned in alignment with the movable double contact 76 which is located between them.

Carried by the opposite arm of the U-shaped bracket 62 is a plate 86 which is adapted to be moved up and down the height of the arm by movement of the assembly screw 88 in a slot 90. This particular plate carries a pin 92 to which a humidity sensitive member 94 is secured. This humidity sensitive element may be a brass strip with a paper strip secured thereto or similar device in the form of a helix and the outer end of said member has secured thereto a pin 96 which extends over and engages in the vertical slot 78 in the arm 72.

Figure 3:
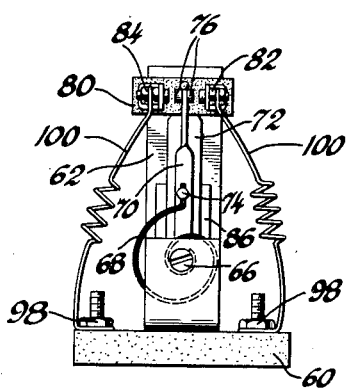
Figure 3 is an end elevation of a humidity compensated thermostat.
Figure 4:
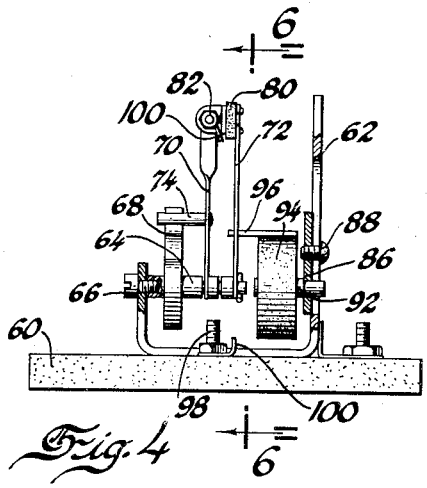
Figure 4 is a side elevation of the same.
Figure 5:
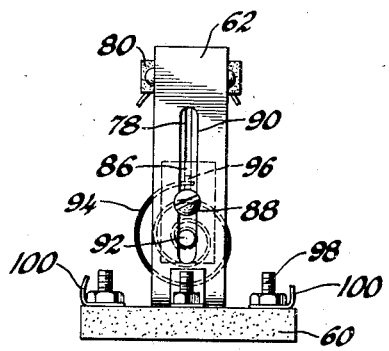
Figure 5 is an elevation of the opposite end from that shown in Figure 3.
Figure 6:
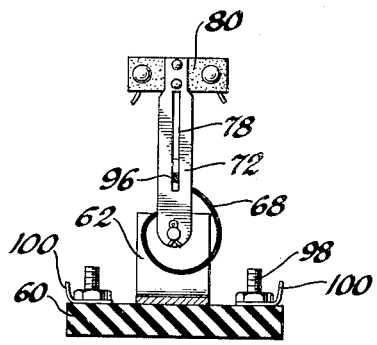
Figure 6 is a sectional view taken on line 6—6 of Figure 4.

A pair of binding posts 98 are provided in the base and are connected by suitable conductors 100 to the substantially stationary contacts 82 and 84. It will thus be seen that assuming a particular location of the humidity element that the relative amount of humidity in the atmosphere in the space in which the instrument is located will determine the position of the arm 72 carrying the two contacts 82 and 84. If the space is relatively dry the arm will incline, let us say toward the right as shown in Figure 3, and if moist on the opposite side. If the temperature falls to too great an extent the arm 76 will move to contact element 84 to turn on the burner or source of heat and if the temperature rises to too great an extent it will tend to move in the opposite direction to contact element 82 to turn off the source of heat or possibly to cause the circulation of additional air to the space. In this construction it will be evident that there is provided a normal temperature control by thermostat plus the compensated movements of the humidity sensitive device which alter the position of the relatively stationary contacts, dependent on the amount of humidity in the space.

It will be obvious also that in either of the designs shown the contacts may be moved to be operated by the other sensitive means without departing from the scope of my invention, thus making either design a compensated humidistat or thermostat, depending upon the location of the contacts.

I claim:

1. In a control device, a base, a substantially U-shaped supporting bracket, a shaft supported parallel to the base on one arm of the bracket, a temperature responsive bimetal helix supported on the shaft, a pivotal contact arm carried by the shaft and connected to the bimetal helix to be operated thereby, a second pivoted arm carried by the shaft spaced from the first, contacts carried by the second arm and positioned to cooperate with the contact arm for switching purposes and humidity responsive means carried by the other arm of the supporting bracket, said humidity responsive means being operatively connected to the second arm to adjust the position of the same due to humidity changes.

2. In a control device, a U-shaped bracket, a removable shaft attached to one arm of the bracket, temperature responsive means on said shaft, contact means pivoted to the shaft and movable by the temperature responsive means, spaced contacts located on either side of the contact means, a member supporting said spaced contacts and pivoted to the shaft, humidity responsive means supported for adjustment on the other arm of the bracket and connecting means between the humidity responsive means and the member whereby the position of the spaced contacts is altered by changes in humidity with respect to the position of the contact movable by the temperature responsive means.

LEROY W. SHUTTS.